US011115810B1

(12) United States Patent
Indurkar

(10) Patent No.: US 11,115,810 B1
(45) Date of Patent: Sep. 7, 2021

(54) BOOTSTRAP ELECTRONIC SUBSCRIBER IDENTITY MODULE CONFIGURATION

(71) Applicant: T-MOBILE INNOVATIONS LLC, Overland Park, KS (US)

(72) Inventor: Dhananjay Indurkar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/821,937

(22) Filed: Mar. 17, 2020

(51) Int. Cl.
*H04W 8/24* (2009.01)
*H04W 4/50* (2018.01)
(Continued)

(52) U.S. Cl.
CPC .......... *H04W 8/245* (2013.01); *G06F 9/4416* (2013.01); *H04W 4/50* (2018.02);
(Continued)

(58) Field of Classification Search
CPC .......... H04B 1/7143; H04B 2001/7154; H04B 1/713; H04B 1/715; H04B 1/10; H04B 1/7097; H04B 1/71; H04B 1/7103; H04B 1/719; H04W 16/14; H04W 12/06; H04W 12/062; H04W 12/065; H04W 12/128; H04W 12/30; H04W 12/10; H04W 12/08; H04W 12/108; H04W 8/24; H04W 8/245; H04W 12/72; H04W 4/50; H04W 12/00; H04W 12/04; H04W 12/069; H04W 12/0431; H04W 12/009; H04W 12/35;
(Continued)

(56) References Cited

U.S. PATENT DOCUMENTS 10,833,929 B2 11/2020 Watsen et al.
10,880,711 B1 12/2020 Holmes
(Continued)

OTHER PUBLICATIONS

Notice of Allowance dated Sep. 4, 2020, U.S. Appl. No. 16/821,950, filed Feb. 17, 2020.
(Continued)

*Primary Examiner* — Meless N Zewdu

(57) ABSTRACT

A method of provisioning an electronic subscriber identity module (eSIM) of a wireless communication device. The method comprises receiving a request for electronic subscriber identity module (eSIM) provisioning data by a provisioning application executing on a computer system from a wireless communication device, wherein the request comprises contextual information, searching a data store by the provisioning application based on the contextual information, receiving a plurality of eSIM provisioning data bundles by the provisioning application from the data store, wherein each eSIM provisioning data bundle provides credentials and data operable for use to establish a wireless communication link to a communication network, and sending the plurality of eSIM provisioning data bundles by the provisioning application to the wireless communication device, wherein the wireless communication device is enabled to establish wireless communication links to different communication networks and access different communication services by activating a different one of the eSIM provisioning bundles.

20 Claims, 8 Drawing Sheets

(51) Int. Cl.
*G06F 9/4401* (2018.01)
*H04W 12/069* (2021.01)
*H04W 12/72* (2021.01)
*H04W 12/0431* (2021.01)

(52) U.S. Cl.
CPC ..... *H04W 12/0431* (2021.01); *H04W 12/069* (2021.01); *H04W 12/72* (2021.01)

(58) Field of Classification Search
CPC ....... H04W 12/47; H04W 8/18; H04W 8/183; H04W 8/20; H04W 8/205; H04W 8/22; G06F 9/4401; G06F 9/4416; G06F 21/30; G06F 21/305; G06F 21/31; G06F 21/44; G06F 21/45; G06F 21/50; G06F 21/51; G06F 21/00; G06F 21/12; G06F 21/121; G06F 21/10; G06F 9/44; G06F 9/4403; G06F 9/445; H04L 29/12235; H04L 61/2023; H04L 67/34; H04L 41/08; H04L 12/2829
See application file for complete search history.

(56) References Cited

U.S. PATENT DOCUMENTS

| | | | |
|---|---|---|---|
| 10,887,741 B1* | 1/2021 | Indurkar | H04W 4/50 |
| 2011/0246374 A1 | 10/2011 | Franz | |
| 2015/0334552 A1 | 11/2015 | Li et al. | |
| 2016/0092145 A1 | 3/2016 | Manning et al. | |
| 2016/0246611 A1* | 8/2016 | Li et al. | G06F 9/4408 |
| 2016/0255567 A1 | 9/2016 | Petersson et al. | |
| 2018/0014184 A1 | 1/2018 | Schell et al. | |
| 2019/0132204 A1 | 5/2019 | McGrath et al. | |
| 2020/0120494 A1* | 4/2020 | Fares et al. | H04W 12/0023 |
| 2020/0178070 A1* | 6/2020 | Yang et al. | H04W 12/00409 |
| 2020/0221294 A1 | 7/2020 | Kang et al. | |
| 2020/0228488 A1* | 7/2020 | Xu et al. | H04L 61/1588 |
| 2020/0236529 A1 | 7/2020 | Anslot et al. | |
| 2020/0260241 A1 | 8/2020 | Sicard | |
| 2020/0322846 A1 | 10/2020 | Hampali et al. | |
| 2020/0322884 A1* | 10/2020 | Di Girolamo et al. | H04W 48/18 |
| 2020/0351651 A1* | 11/2020 | Koo et al. | H04W 12/0023 |
| 2020/0351761 A1 | 11/2020 | Horna | |
| 2020/0389783 A1 | 12/2020 | Kang et al. | |
| 2020/0404501 A1* | 12/2020 | Kang et al. | H04W 12/0609 |
| 2021/0029761 A1 | 1/2021 | Jung et al. | |
| 2021/0076195 A1* | 3/2021 | Chaugule et al. | H04W 8/205 |
| 2021/0112401 A1 | 4/2021 | Chadwick et al. | |
| 2021/0120387 A1 | 4/2021 | Roy et al. | |
| 2021/0120424 A1 | 4/2021 | Kang et al. | |

OTHER PUBLICATIONS

Indurkar, Dhananjay, "Activation Communication Addresses of Internet of Things Devices", filed Nov. 24, 2020, U.S. Appl. No. 17/102,627.
First Action Interview Pilot Program Pre-Interview Communication dated Jan. 29, 2021, U.S. Appl. No. 16/821,943, filed Feb. 19, 2021.
Indurkar, Dhananjay, et al., "Embedded Subscriber Identity Module (eSIM) Profile Adaptation Based on Context," filed May 21, 2020, U.S. Appl. No. 16/880,723.
Indurkar, Dhananjay, et al., "Triggering Electronic Subscriber Identity Module Activation", filed Mar. 17, 2020, U.S. Appl. No. 16/821,943.
Indurkar, Dhananjay, et al., "Activation Communication Addresses of Internet of Things Devices", filed Mar. 17, 2020, U.S. Appl. No. 16/821,950.
Indurkar, Dhananjay, et al., "Internet of Things (IoT) Devices Wireless Communication Service Management Platform" filed May 28, 2020, U.S. Appl. No. 16/886,521.
FAIPP Pre-Interview Communication dated Apr. 15, 2021, U.S. Appl. No. 16/880,723, filed May 21, 2020.
Notice of Allowance dated Apr. 29, 2021, U.S. Appl. No. 16/821,943, filed Feb. 19, 2021.
FAIPP Pre-Interview Communication dated Apr. 5, 2021, U.S. Appl. No. 16/886,521, filed May 28, 2020.
Notice of Allowance dated Jun. 14, 2021, U.S. Appl. No. 16/880,723, filed May 21, 2020.
Ndurkar, Dhananjay, et al., "Embedded Subscriber Identity Module (eSIM) Profile Adaptation Based on Context," filed May 18, 2021, International Application No. PCT/US21/33041.
Ndurkar, Dhananjay, et al., "Internet of Things (IoT) Devices Wireless Communication Service Management Platform" filed May 24, 2021, International Application No. PCT/US21/33922.

* cited by examiner

BOOTSTRAP ELECTRONIC SUBSCRIBER IDENTITY MODULE CONFIGURATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wireless communication devices may authenticate into a radio access network (RAN) operated by a cellular communication service provider by presenting confidential authentication credentials to a cell site, for example to a cell tower. In an initial state, a wireless device may not yet be provisioned with authentication credentials. In this case, the wireless device may be granted provisional access to the RAN subject to the constraint that it may only perform activation activities such as messaging with a provisioning system to obtain conventional authentication credentials. The authentication credentials may be stored in an electronic subscriber identity module (eSIM) chip that is integrated into the mobile communication device, for example electrically connected to the communication bus of the wireless communication device circuit card. This eSIM may be said to be non-removable, in the sense that a non-technical lay person could not ordinarily remove the eSIM without damaging the wireless communication device.

SUMMARY

In an embodiment, a method of provisioning an electronic subscriber identity module (eSIM) of a wireless communication device is disclosed. The method comprises receiving a request for electronic subscriber identity module (eSIM) provisioning data by a provisioning application executing on a first computer system from a wireless communication device, wherein the request comprises contextual information, based on the contextual information, selecting a decision making server from among a plurality of decision making servers that are associated with eSIM provisioning data, and sending the request for eSIM provisioning data and the contextual information by the provisioning application to the selected decision making server. The method further comprises searching a data store by an eSIM provisioning data selection application executing on the selected decision making server based on the contextual information, receiving a plurality of eSIM provisioning data bundles by the eSIM provisioning data selection application from the data store, wherein each eSIM provisioning data bundle provides authentication credentials and configuration data operable for use by the wireless communication device to establish a wireless communication link to a communication network, and sending the plurality of eSIM provisioning data bundles by the eSIM provisioning data selection application to the provisioning application. The method further comprises sending the plurality of eSIM provisioning data bundles by the provisioning application to the wireless communication device, wherein the wireless communication device is enabled to establish wireless communication links to different communication networks and access different wireless communication services by activating a different one of the eSIM provisioning bundles.

In another embodiment, a system for provisioning an electronic subscriber identity module (eSIM) to a wireless communication device. The system comprises a processor, a non-transitory memory, a data store, and an eSIM provisioning application stored in the non-transitory memory. The data store stores a plurality of eSIM provisioning data bundles, wherein each eSIM provisioning data bundle comprises at least one of a wireless access authentication key, a billing parameter, a rating parameter, a charging parameter, a quality of service (QoS) parameter, a public land mobile network (PLMN) identity, an international mobile subscriber identity (IMSI), a mobile subscriber identification number (MSIN), a mobile network authority (MNC) identity, a mobile country code (MCC), a coverage map, or a preferred roaming list (PRL) a service key. When executed by the processor, the eSIM provisioning application receives a request for electronic subscriber identity module (eSIM) provisioning data from a wireless communication device, wherein the request comprises contextual information, and searches the data store based on the contextual information. The eSIM provisioning application further receives a plurality of eSIM provisioning data bundles from the data store and sends the plurality of eSIM provisioning data bundles by the provisioning application to the wireless communication device, wherein the wireless communication device is enabled to establish wireless communication links to different communication networks and access different wireless communication services by activating a different one of the eSIM provisioning bundles.

In yet another embodiment, a method of provisioning an electronic subscriber identity module (eSIM) of a wireless communication device is disclosed. The method comprises receiving a request for electronic subscriber identity module (eSIM) provisioning data by a provisioning application executing on a computer system from a wireless communication device, wherein the request comprises contextual information and searching a data store by the provisioning application based on the contextual information. The method further comprises receiving a plurality of eSIM provisioning data bundles by the provisioning application from the data store, wherein each eSIM provisioning data bundle provides authentication credentials and configuration data operable for use by the wireless communication device to establish a wireless communication link to a communication network and sending the plurality of eSIM provisioning data bundles by the provisioning application to the wireless communication device, wherein the wireless communication device is enabled to establish wireless communication links to different communication networks and to access different wireless communication services by activating a different one of the eSIM provisioning bundles.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
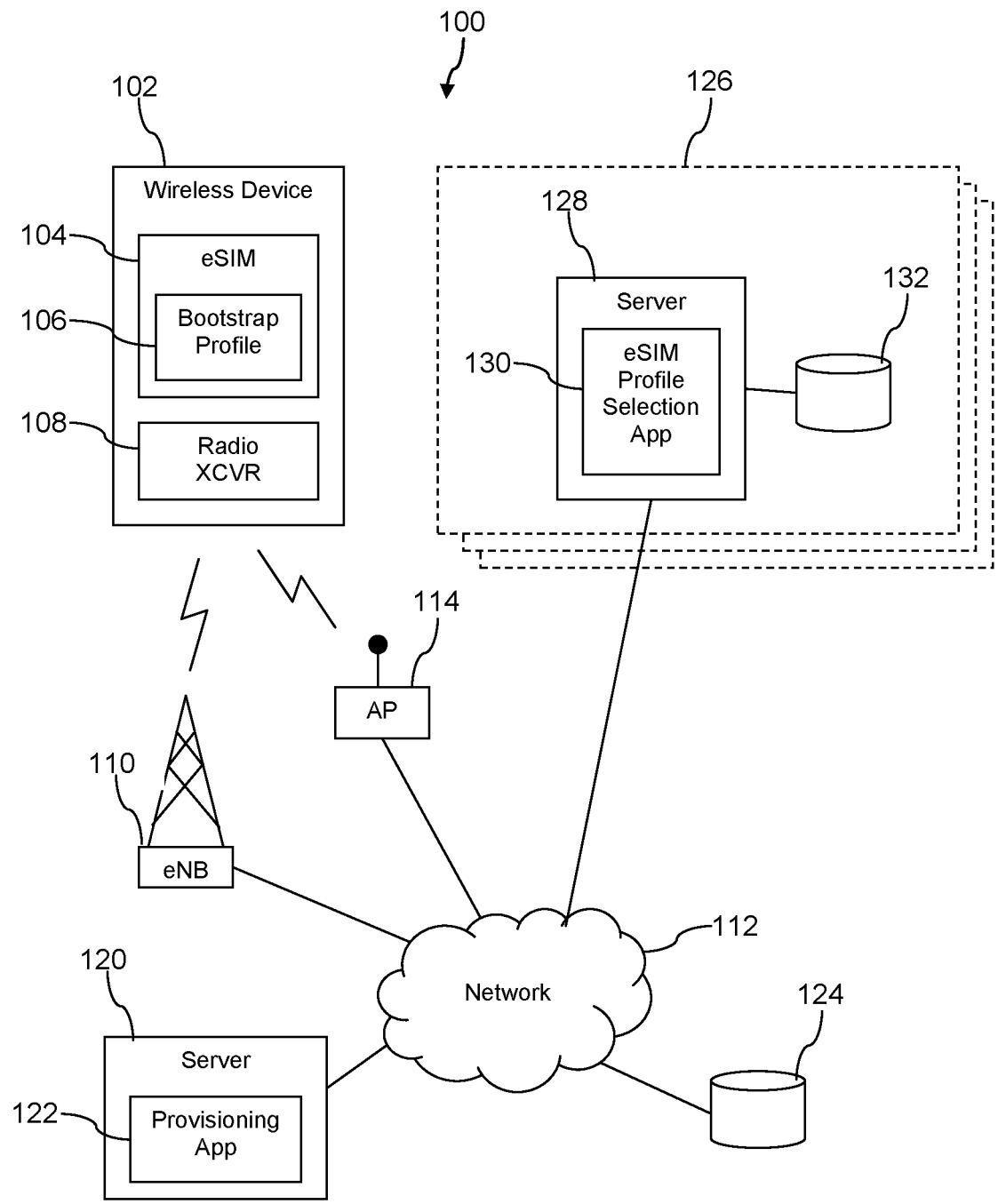
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system and method for dynamically provisioning an electronic subscriber identity module (eSIM) in a wireless communication device. The wireless communication device initially may be provisioned with a bootstrap eSIM profile which identifies an eSIM provisioning server. The bootstrap eSIM profile does not provide authentication credentials for obtaining full access to a radio access network (RAN). The wireless communication device, however, may be granted access by a RAN for purposes of requesting one or more eSIM profiles from the eSIM provisioning server. The RAN may restrict the communication activities of the wireless communication device presenting bootstrap credentials to strictly those communication activities that pertain to requesting and receiving an eSIM profile from the eSIM provisioning server.

The eSIM provisioning server, when it receives a request for an eSIM profile from a wireless communication device, may search for one or more suitable eSIM profiles based on contextual information provided in the eSIM profile request message. This contextual information may comprise one or more of a make of the wireless communication device, a model of the wireless communication device, a location of the wireless communication device, and/or information about the wireless communication capabilities of the wireless communication device. The eSIM provisioning server may search for eSIM profiles that are suitable in a data store. The eSIM provisioning server may find a plurality of eSIM profiles that are suitable given the contextual information provided in the request from the wireless communication device. The eSIM provisioning server may send the plurality of eSIM profiles back to the wireless communication device. The wireless communication device may initialize one of the eSIM profiles that it receives and begin conventional wireless communication based on the initialize eSIM profile. In an embodiment, the eSIM provisioning server may send eSIM profile selection rules or instructions along with the eSIM profiles themselves back to the wireless communication device. The wireless communication device may then execute the selection rules to select and initiate one of the eSIM profiles.

If the eSIM provisioning server does not find an eSIM profile that is consistent with the contextual information provided by the wireless communication device it may dynamically create one or more eSIM profiles based on the contextual information. Alternatively, in an embodiment, the eSIM provisioning server may send the contextual information and request one or more eSIM profiles from a decision making server that is operated by a wireless communication service provider associated with the wireless communication device (e.g., the wireless communication device may be affiliated with or sold by the service provider or may be subscribed to receive wireless communication service with the service provider). The decision making server may look-up or dynamically create one or more eSIM profiles based on the contextual information.

The eSIM profile may comprise one or more of a coverage map, RAN authentication credentials, communication service keys, application service keys, encryption keys, a phone number, a network identity, a country code. The eSIM profile may identify one or more radio frequency bands for use by the wireless communication device. The eSIM profile may comprise one or more of a wireless access authentication key, a billing parameter, a rating parameter, a charging parameter, a quality of service (QoS) parameter, a public land mobile network (PLMN) identity, an international mobile subscriber identity (IMSI), a mobile subscriber identification number (MSIN), a mobile network authority (MNC) identity, a mobile country code (MCC), a coverage map, or a preferred roaming list (PRL) a service key.

Turning now to FIG. 1, a communication system 100 is described. In an embodiment, the system 100 comprises a wireless communication device 102 comprising an electronic subscriber identity module (eSIM) 104 that initially contains a bootstrap profile 106. The device 102 further comprises at least one radio transceiver 108. The device 102 may be an internet of things (IoT) device. The device 102 may be a mobile phone, a personal digital assistant (PDA), a smart phone, a wearable computer, a headset computer, a laptop computer, a tablet computer, or a notebook computer.

In an embodiment, the radio transceiver 108 is configured to establish a wireless communication link with a cell site 110 according to a 5G, a long term evolution (LTE), a code division multiple access (CDMA), or a global system for mobile communications (GSM) telecommunication protocol. The cell site 110 is configured to communicatively couple the device 102 to the network 112. The network comprises one or more private networks, one or more public networks, or a combination thereof. In an embodiment, the radio transceiver is configured to establish a wireless communication link with a wireless access point (AP) 114, for example using on a WiFi wireless communication protocol. The AP 114 is configured to communicatively couple the device 102 to the network 112.

While one wireless communication device 102, one cell site 110, and one access point 114 are shown in FIG. 1, it is understood that the system 100 may comprise any number of devices 102, any number of cell sites 110, and any number of APs 114. It is expected that the system 100 will comprise a mix of types of wireless communication devices 102, for example some of the devices 102 are expected to be IoT devices and others of the devices 102 are expected to be smart phones and others of the devices 102 are expected to be tablet computers.

The bootstrap profile 106 may be used to bootstrap the wireless device 102 to configure itself for wireless communication. When the wireless device 102 powers on and determines that the eSIM 104 is provisioned only with the bootstrap profile 106, it uses the bootstrap credentials to establish a wireless communication link to the cell site 110 or the AP 114, which in turn couples the device 102 to the network 112 and via the network 112 to a server 120 that executes a provisioning application 122. In general, the eSIM 104 is an integrated circuit that is non-removably installed or permanently installed on a circuit board of the wireless communication device 102, in the sense that a non-technical lay person could not ordinarily remove the eSIM 104 without damaging the device 102. The radio transceiver 108 may invoke methods on the eSIM 104 to obtain communication parameters, identity information, authentication credentials, and service keys for use in establishing wireless communication links with the cell site 110 and/or the AP 114.

The device 102 sends a request to the provisioning application 122 for an eSIM profile. An eSIM profile comprises provisioning information and/or configuration information for establishing and conducting wireless communications. Different eSIM profiles may comprise different data information items. An eSIM profile may comprise one or more of a coverage map, a preferred roaming list (PRL), radio access network (RAN) authentication credentials, communication service keys, application service keys, encryption keys, a phone number, a network identity, and a country code. The eSIM profile may identify one or more radio frequency bands for use by the wireless communication device. The eSIM profile may comprise one or more of a wireless access authentication key, a billing parameter, a rating parameter, a charging parameter, a quality of service (QoS) parameter, a public land mobile network (PLMN) identity, an international mobile subscriber identity (IMSI), a mobile subscriber identification number (MSIN), a mobile network authority (MNC) identity, a mobile country code (MCC), a coverage map, or a preferred roaming list (PRL) a service key. A first eSIM profile may configure the wireless communication device 102 for wireless communication on a first wireless communication network with subscriber service privileges in the first wireless communication network (e.g., not restricted by constraints that may be applied to a roaming device), and a second eSIM profile may configure the device 102 for wireless communication on a second wireless communication network with subscriber service privileges in the second wireless communication network (e.g., not restricted by constraints that may be applied to a roaming device).

The eSIM profile request message that the wireless communication device 102 sends to the provisioning application 122 comprises contextual information. The contextual information may comprise an identity of a make and model of the device 102. The contextual information may comprise an identity of a location where the device 102 is located. The contextual information may comprise information about the technical capabilities of the device 102, for example radio frequency bands that the radio transceiver 108 is able to transmit on, radio frequency bands that the radio transceiver 108 is able to receive on, a signal strength that the radio transceiver 108 is able to transmit with, a maximum data transmit speed, a maximum data receive speed, and other technical specifications of the device 102. The contextual information may comprise a unique identity of the wireless communication device 102, for example an electronic serial number (ESN) of the device 102 or a mobile equipment identity (MEID) of the device 102.

The provisioning application 122 may look up one or more suitable eSIM profiles in a data store 124 based on the contextual information. In an embodiment, the server 120 and the provisioning application 122 operate as a clearing house for a plurality of different wireless communication service providers. Said in another way, the server 120 and the provisioning application 122 may operate as a neutral broker of eSIM profiles to provide eSIM profiles associated with different wireless communication service providers to devices 102. In an embodiment, the provisioning application 122 may send a plurality of eSIM profiles to the wireless communication device 102, and the device 102 may store the plurality of eSIM profiles in the eSIM 104. The device 102 may engage in wireless communications by using a selected one of the eSIM profiles. One or more wireless communication service providers may have created eSIM profiles and stored these eSIM profiles in the data store 124 so the provisioning application 122 may look them up and propagate them to devices 102.

If the provisioning application 122 does not find an eSIM profile that is suitable to the device 102, based on the contextual information provided by the device 102, the provisioning application 122 may automatically create one or more suitable eSIM profiles, store them in the data store 124, and send the one or more suitable eSIM profiles to the device 102. Alternatively, the provisioning application 122 may send the contextual information and the request for eSIM profiles to a proprietary domain 126, to a decision making server computer 128 that executes an eSIM profile selection application 130 that selects one or more eSIM profiles from a proprietary data store 132 based on the contextual information.

Figure 2:
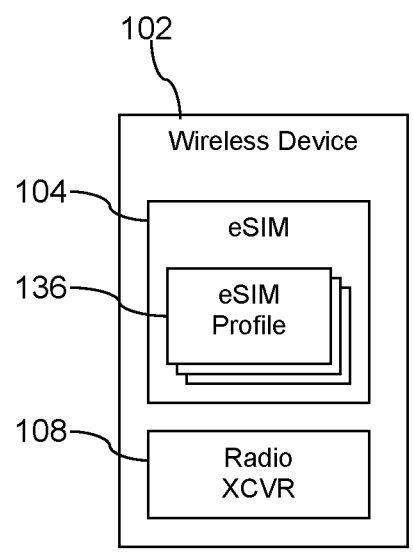
FIG. 2 is a block diagram of a wireless communication device according to an embodiment of the disclosure.

Turning now to FIG. 2, an illustration of a wireless communication device 102 after being provisioned is described. When it has been provisioned, the eSIM 104 may store a plurality of eSIM profiles 136, for example a first eSIM profile, a second eSIM profile, and a third eSIM profile. Different eSIM profiles may be selected and activated by the device 102 for conduction wireless communication via the radio transceiver 108, for example in conducting cellular wireless communications. A first eSIM profile 136 may configure the device 102 for wireless communication in a first wireless communication network with full access privileges in the first wireless communication network (e.g., access privileges equivalent to those of a subscriber to the first wireless communication network rather than restricted privileges that may be associated with a device that is roaming in the first wireless communication network). A second eSIM profile 136 may configure the device 102 for wireless communication in a second wireless communication network with full access privileges in the second wireless network. By being able to be configured for "home network" access privileges in multiple wireless networks, the provisioning of a plurality of eSIM profiles 136 to the device 102 enables the device to optimize communication costs and communication services. The different eSIM profiles 136 may provide alternative mixes of operating parameters and/or radio spectrum parameters that promote the wireless communication device 102 activating one of the eSIM profiles 136 that best matches a current communication need of the device 102.

In an embodiment, some of the plurality of eSIM profiles 136 may correspond to different roles or uses of the device 102. For example, with a first eSIM profile 136 active on the device 102, the device 102 may support a first responder performing his or her job as a first responder, while when a second eSIM profile 136 active on the same device 102, the device 102 may be used by the first responder when he or she is off duty. Because a plurality of eSIM profiles 136 are downloaded and stored in the eSIM 104, the device 102 can dynamically and rapidly switch between activated eSIM profiles 136 as desired. The device 102 can switch between activated eSIM profiles 136 even when the device 102 is out of coverage of a first network associated with an active eSIM profile 136 because the device 102 does not need to download the eSIM profile 136 then when it is out of coverage. A first eSIM profile 136 may be selected to be activated that provides higher quality of service (QoS) albeit with higher service cost to the subscriber when conducting a first communication activity, and a second eSIM profile 136 may be selected to be activated that provides lower QoS but with lower service cost to the subscriber when conducting a second communication activity.

Figure 3:
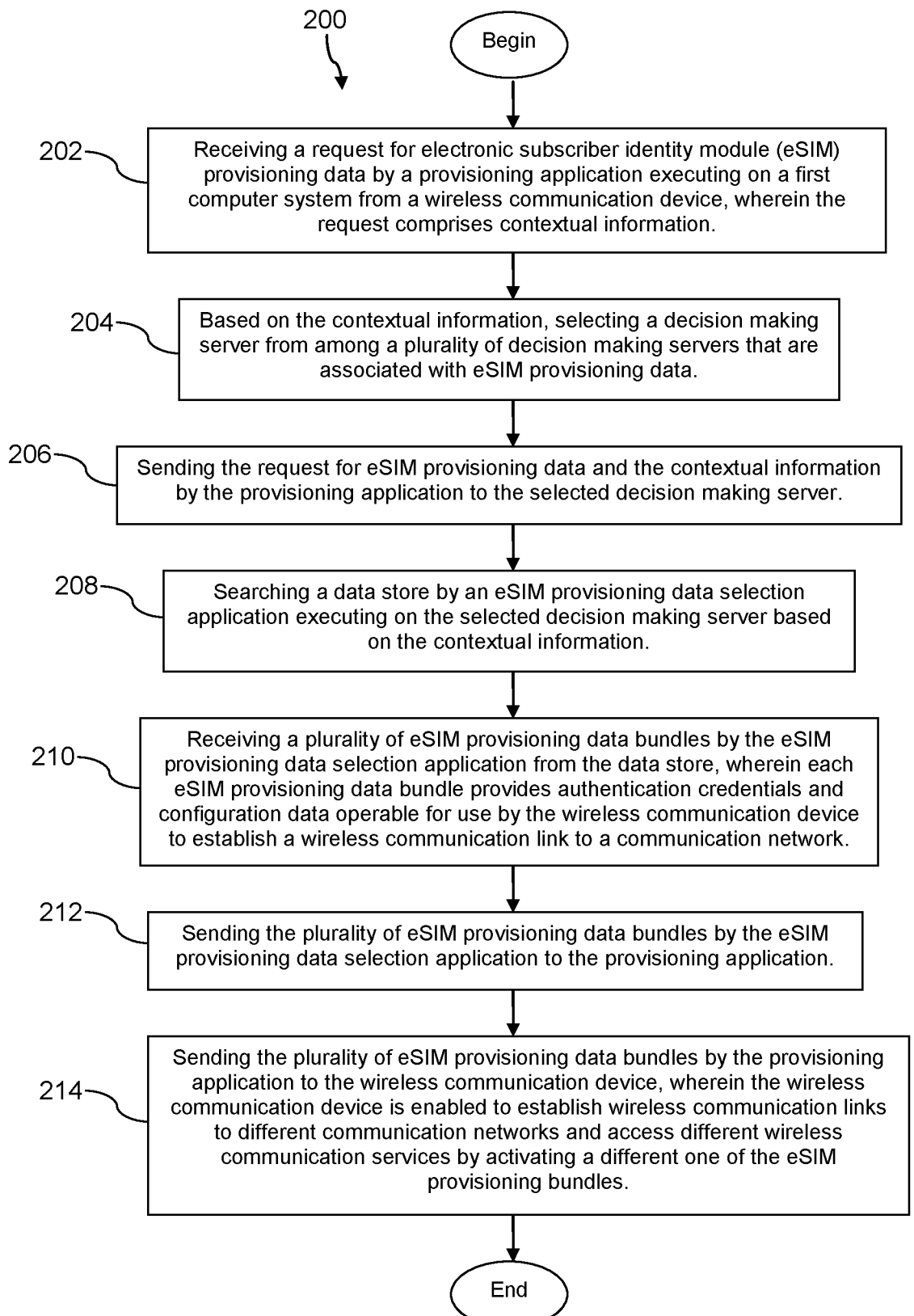
FIG. 3 is a flow chart of a method according to an embodiment of the disclosure.

Turning now to FIG. 3, a method 200 is described. In an embodiment, the method 200 is a method of provisioning an electronic subscriber identity module (eSIM) of a wireless communication device. At block 202, the method 200 comprises receiving a request for electronic subscriber identity module (eSIM) provisioning data by a provisioning application executing on a first computer system from a wireless communication device, wherein the request comprises contextual information.

At block 204, the method 200 comprises, based on the contextual information, selecting a decision making server from among a plurality of decision making servers that are associated with eSIM provisioning data. At block 206, the method 200 comprises sending the request for eSIM provisioning data and the contextual information by the provisioning application to the selected decision making server.

At block 208, the method 200 comprises searching a data store by an eSIM provisioning data selection application executing on the selected decision making server based on the contextual information. At block 210, the method 200 comprises receiving a plurality of eSIM provisioning data bundles by the eSIM provisioning data selection application from the data store, wherein each eSIM provisioning data bundle provides authentication credentials and configuration data operable for use by the wireless communication device to establish a wireless communication link to a communication network. In an embodiment, the eSIM provisioning data selection application receives at least 3 eSIM provisioning bundles and less than 30 eSIM provisioning bundles. In an embodiment, the eSIM provisioning data selection application receives at least 6 eSIM provisioning bundles and less than 15 eSIM provisioning bundles.

At block 212, the method 200 comprises sending the plurality of eSIM provisioning data bundles by the eSIM provisioning data selection application to the provisioning application. At block 214, the method 200 comprises sending the plurality of eSIM provisioning data bundles by the provisioning application to the wireless communication device, wherein the wireless communication device is enabled to establish wireless communication links to different communication networks and access different wireless communication services by activating a different one of the eSIM provisioning bundles.

In an embodiment, method 200 further comprises receiving a second request for electronic subscriber identity module (eSIM) provisioning data by the provisioning application from a second wireless communication device, wherein the second request comprises second contextual information, based on the second contextual information, obtaining a second plurality of eSIM provisioning data bundles by the provisioning application, wherein each second eSIM provisioning data bundle provides authentication credentials and configuration data operable for use by the second wireless communication device to establish a wireless communication link to a communication network, and sending the second plurality of eSIM provisioning data bundles by the provisioning application to the second wireless communication device, wherein the second wireless communication device is enabled to establish a wireless communication link to a communication network. In an embodiment, the method 200 further comprises receiving a third request for electronic subscriber identity module (eSIM) provisioning data by the provisioning application from a third wireless communication device, wherein the second request comprises second contextual information, based on the third contextual information, obtaining a third plurality of eSIM provisioning data bundles by the provisioning application, wherein each third eSIM provisioning data bundle provides authentication credentials and configuration data operable for use by the third wireless communication device to establish a wireless communication link to a communication network, and sending the third plurality of eSIM provisioning data bundles by the provisioning application to the third wireless communication device, wherein the third wireless communication device is enabled to establish a wireless communication link to a communication network with access privileges of a first responder when using a first eSIM provisioning bundle to authenticate, for example to authenticate into the RAN to obtain a wireless link, and is enabled to establish a wireless communication link to the communication network with access privileges of an ordinary service subscriber when using a second eSIM provisioning bundle to authenticate, for example to authenticate into the RAN to obtain a wireless link.

Figure 4:
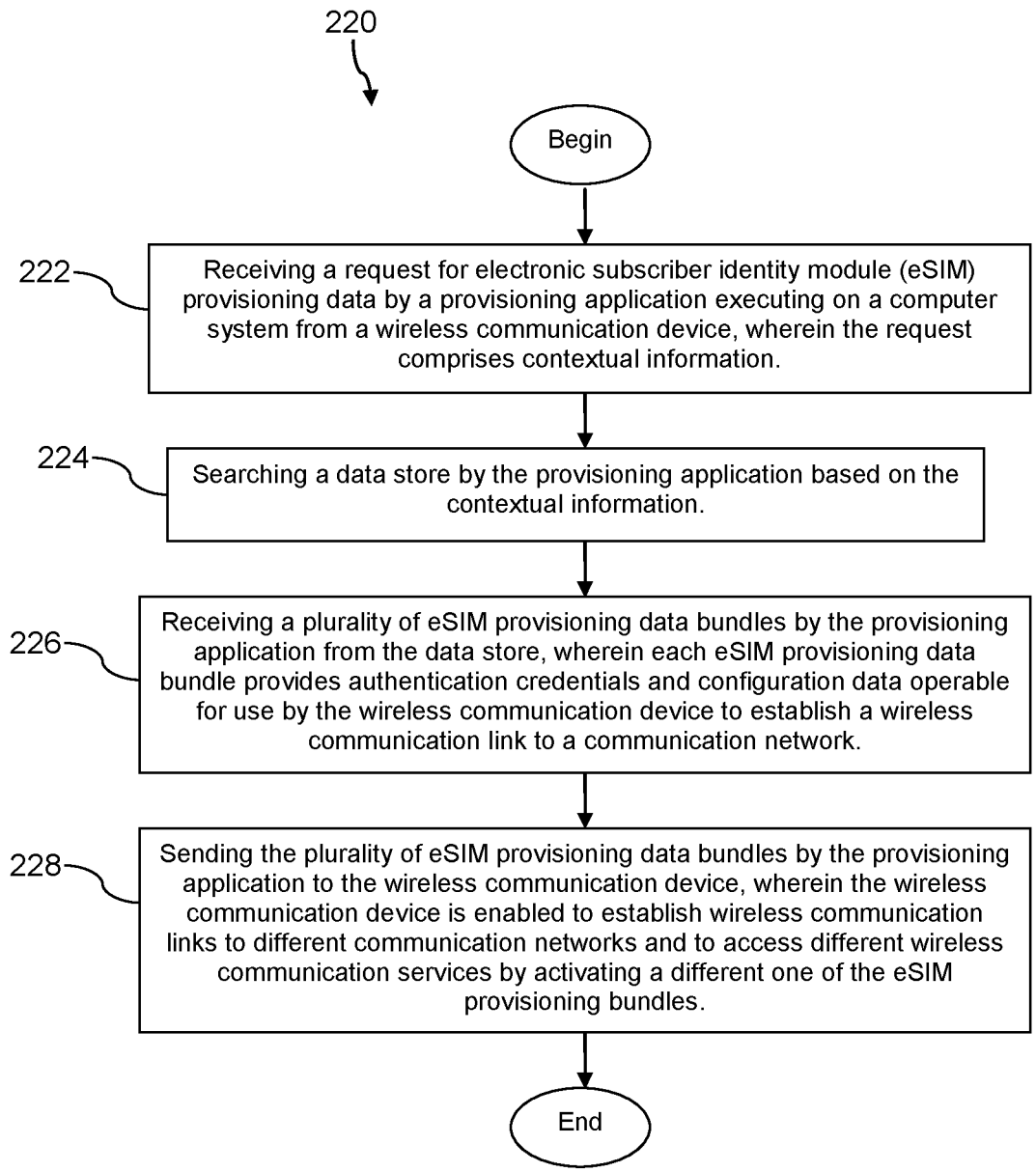
FIG. 4 is a flow chart of another method according to an embodiment of the disclosure.

Turning now to FIG. 4, a method 220 is described. In an embodiment, the method 220 is a method of provisioning an electronic subscriber identity module (eSIM) of a wireless communication device. A block 222, the method 220 comprises receiving a request for electronic subscriber identity module (eSIM) provisioning data by a provisioning application executing on a computer system from a wireless communication device, wherein the request comprises contextual information.

At block 224, the method 220 comprises searching a data store by the provisioning application based on the contextual information. At block 226, the method 220 comprises receiving a plurality of eSIM provisioning data bundles by the provisioning application from the data store, wherein each eSIM provisioning data bundle provides authentication credentials and configuration data operable for use by the wireless communication device to establish a wireless communication link to a communication network. At block 228, the method 220 comprises sending the plurality of eSIM provisioning data bundles by the provisioning application to the wireless communication device, wherein the wireless communication device is enabled to establish wireless communication links to different communication networks and to access different wireless communication services by activating a different one of the eSIM provisioning bundles.

Figure 5:
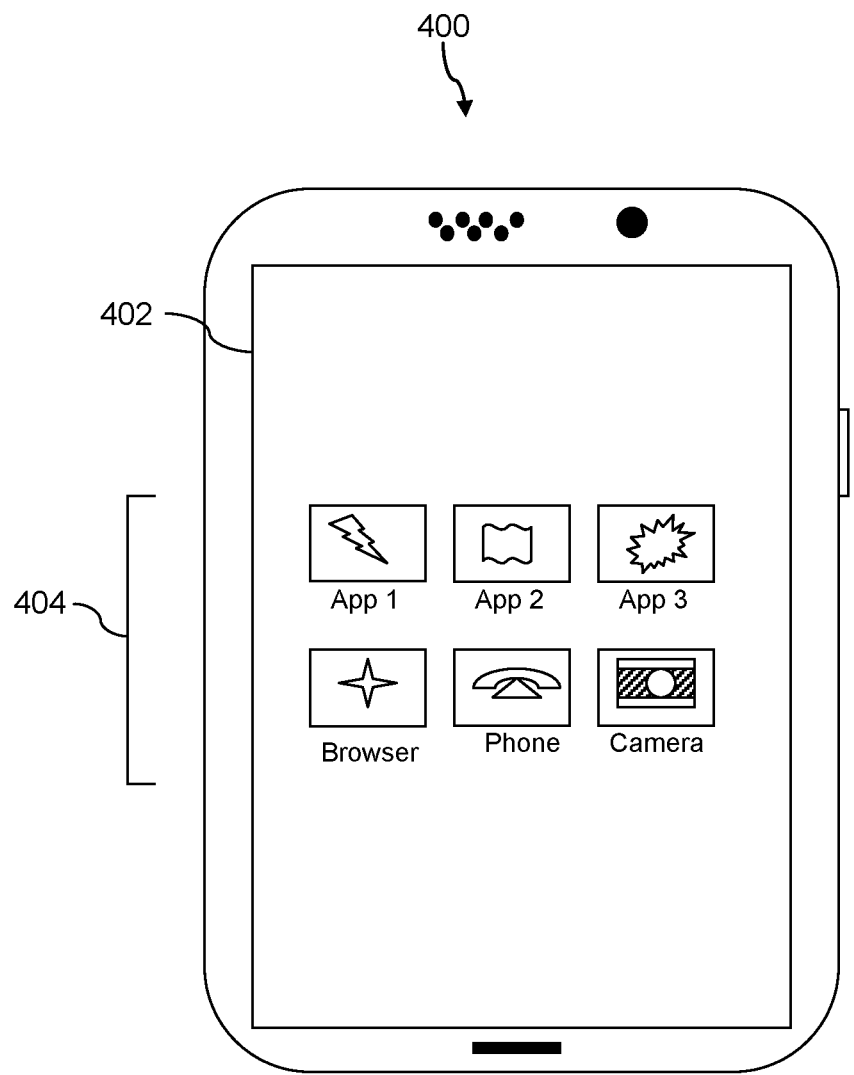
FIG. 5 is an illustration of a mobile communication device according to an embodiment of the disclosure.

FIG. 5 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 6:
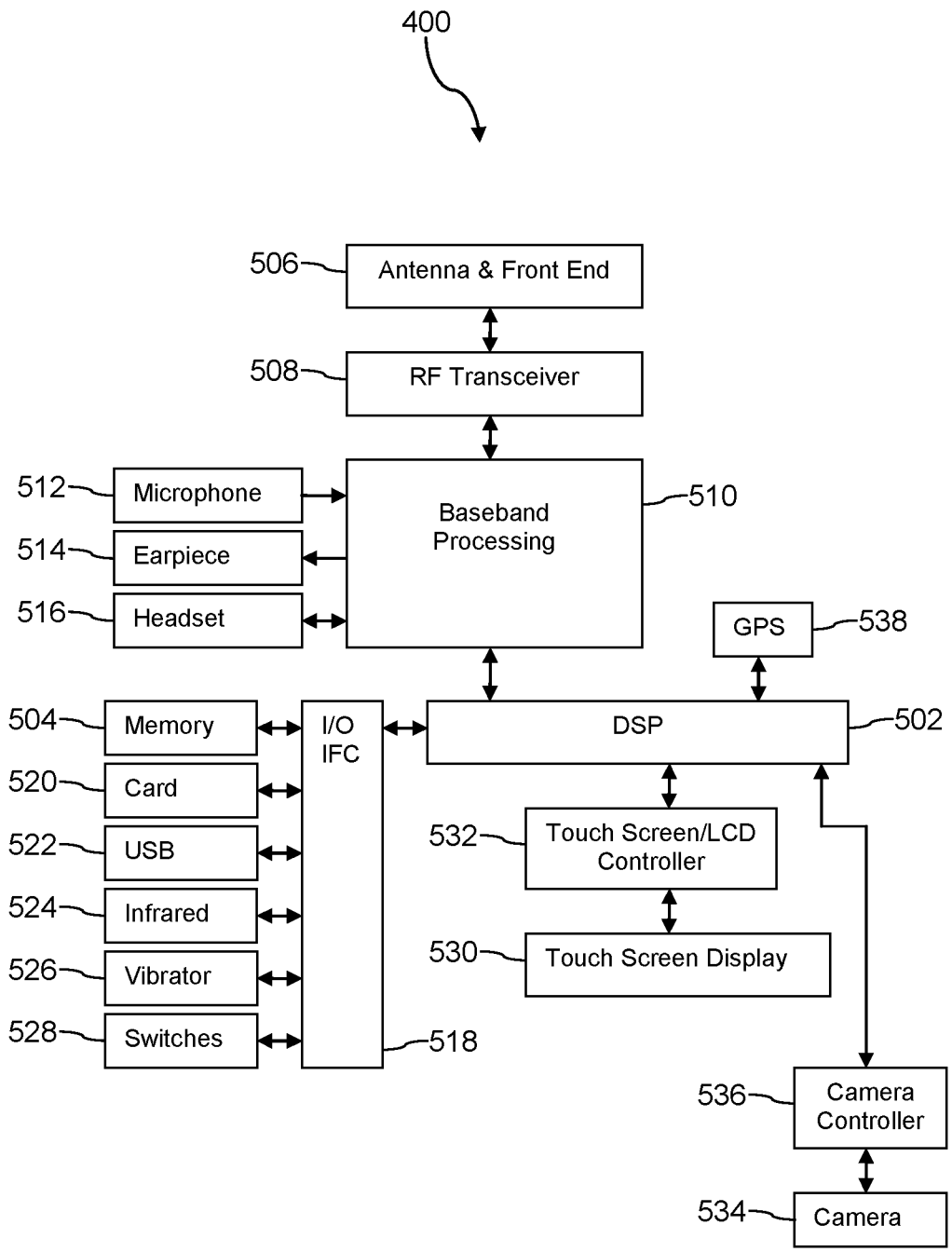
FIG. 6 is a block diagram of a hardware architecture of a wireless communication device according to an embodiment of the disclosure.

FIG. 6 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 7A:
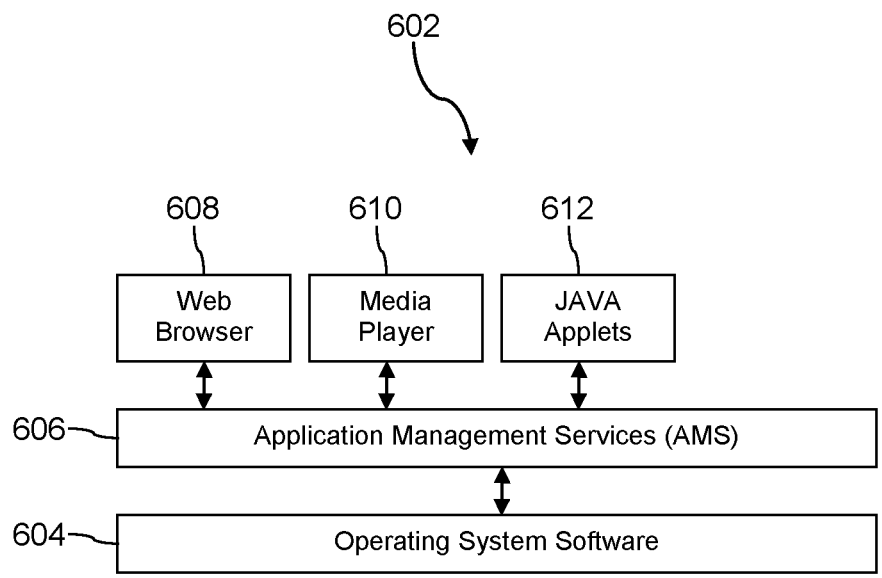
FIG. 7A is a block diagram of a software architecture of a wireless communication device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 7A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 7B:
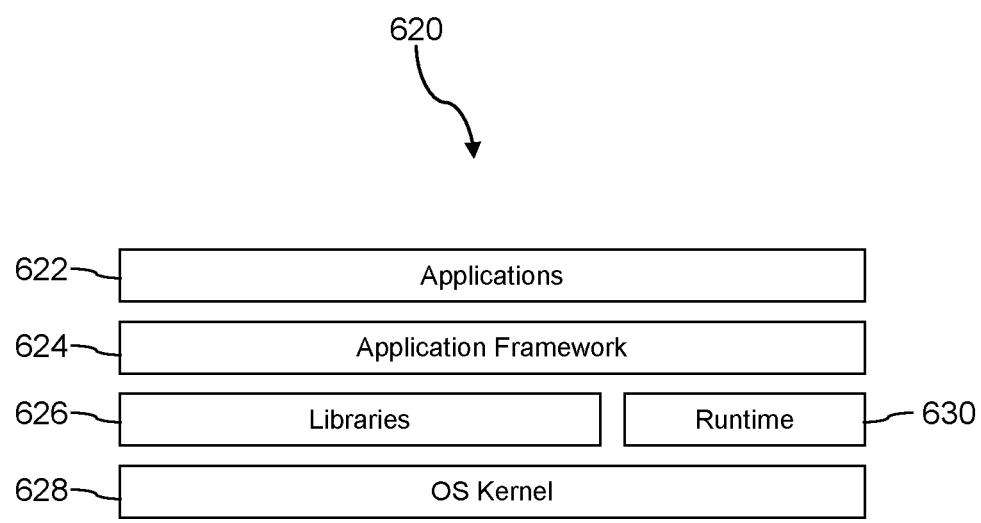
FIG. 7B is a block diagram of another software architecture of a wireless communication device according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
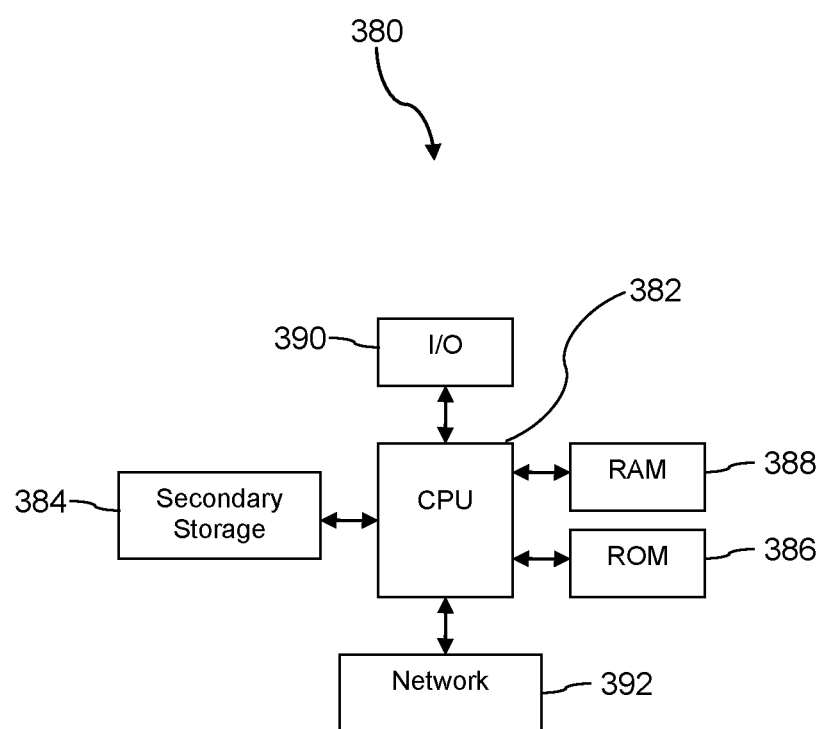
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable system interface specification (DOCSIS), wave division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of provisioning an electronic subscriber identity module (eSIM) of a wireless communication device, comprising:

receiving a request for electronic subscriber identity module (eSIM) provisioning data by a provisioning application executing on a first computer system from a wireless communication device, wherein the request comprises contextual information and is received by the provisioning application from the wireless communication device according to a bootstrap eSIM profile that grants restricted access by the wireless communication device to a radio access network (RAN) for the purpose of requesting and receiving the eSIM provisioning data;

based on the contextual information, selecting a decision making server from among a plurality of decision making servers that are associated with eSIM provisioning data;

sending the request for eSIM provisioning data and the contextual information by the provisioning application to the selected decision making server;

searching a data store by an eSIM provisioning data selection application executing on the selected decision making server based on the contextual information;

receiving a plurality of eSIM provisioning data bundles by the eSIM provisioning data selection application from the data store, wherein each eSIM provisioning data bundle provides authentication credentials and configuration data operable for use by the wireless communication device to establish a wireless communication link to a communication network;

sending the plurality of eSIM provisioning data bundles by the eSIM provisioning data selection application to the provisioning application; and sending, according to the bootstrap eSIM profile, the plurality of eSIM provisioning data bundles by the provisioning application to the wireless communication device, wherein the wireless communication device is enabled to establish wireless communication links to different communication networks at least via the RAN and access different wireless communication services by activating a different one of the eSIM provisioning bundles.

2. The method of claim 1, wherein the wireless communication device is an Internet of Things (IoT) device.

3. The method of claim 1, wherein the wireless communication device is one of a mobile phone, a smart phone, a personal digital assistant (PDA), a wearable computer, a headset computer, a laptop computer, a notebook computer, or a tablet computer.

4. The method of claim 1, wherein the contextual information comprises at least one of an identity of a maker of the wireless communication device, an identity of a model of the wireless communication device, a location of the wireless communication device, a radio frequency band supported by the wireless communication device, a maximum data receive speed of the wireless communication device, a maximum data transmit speed of the wireless communication device, or a unique identity of the wireless communication device.

5. The method of claim 1, wherein the plurality of eSIM provisioning bundles sent to the wireless communication device comprises at least 3 eSIM provisioning bundles and less than 30 eSIM provisioning bundles.

6. The method of claim 1, wherein one of the eSIM provisioning bundles comprises one or more of a public land mobile network (PLMN) identity, an international mobile subscriber identity (IMSI), a mobile subscriber identification number (MSIN), a mobile network authority (MNC) identity, a mobile country code (MCC), a coverage map, or a preferred roaming list (PRL) a service key.

7. The method of claim 1, wherein one of the eSIM provisioning data bundles comprises one or more of a wireless access authentication key, a billing parameter, a rating parameter, a charging parameter, or a quality of service (QoS) parameter.

8. The method of claim 1, further comprising:

receiving a second request for electronic subscriber identity module (eSIM) provisioning data by the provisioning application from a second wireless communication device, wherein the second request comprises second contextual information;

based on the second contextual information, obtaining a second plurality of eSIM provisioning data bundles by the provisioning application, wherein each second eSIM provisioning data bundle provides authentication credentials and configuration data operable for use by the second wireless communication device to establish a wireless communication link to a communication network; and sending the second plurality of eSIM provisioning data bundles by the provisioning application to the second wireless communication device, wherein the second wireless communication device is enabled to establish a wireless communication link to a communication network.

9. The method of claim 1, further comprising:

receiving a third request for electronic subscriber identity module (eSIM) provisioning data by the provisioning application from a third wireless communication device, wherein the second request comprises second contextual information;

based on the third contextual information, obtaining a third plurality of eSIM provisioning data bundles by the provisioning application, wherein each third eSIM provisioning data bundle provides authentication credentials and configuration data operable for use by the third wireless communication device to establish a wireless communication link to a communication network; and sending the third plurality of eSIM provisioning data bundles by the provisioning application to the third wireless communication device, wherein the third wireless communication device is enabled to establish the wireless communication link to a communication network with access privileges of a first responder when using a first of the third eSIM provisioning data bundles to authenticate and is enabled to establish the wireless communication link to the communication network with access privileges of an ordinary service subscriber when using a second of the third eSIM provision data bundles to authenticate.

10. A system for provisioning an electronic subscriber identity module (eSIM) to a wireless communication device, comprising:

a processor;

a non-transitory memory;

a data store storing a plurality of eSIM provisioning data bundles, wherein each eSIM provisioning data bundle comprises at least one of a wireless access authentication key, a billing parameter, a rating parameter, a charging parameter, a quality of service (QoS) parameter, a public land mobile network (PLMN) identity, an international mobile subscriber identity (IMSI), a mobile subscriber identification number (MSIN), a mobile network authority (MNC) identity, a mobile country code (MCC), a coverage map, or a preferred roaming list (PRL) a service key; and an eSIM provisioning application stored in the non-transitory memory that, when executed by the processor:

receives a request for the electronic subscriber identity module (eSIM) provisioning data from a wireless communication device, wherein the request comprises contextual information and is received by the provisioning application from the wireless communication device via a bootstrap eSIM profile that grants restricted access by the wireless communication device to a radio access network (RAN) for the purpose of requesting and receiving the eSIM provisioning data, searches the data store based on the contextual information, receives a plurality of eSIM provisioning data bundles from the data store, and sends, according to the bootstrap eSIM profile, the plurality of eSIM provisioning data bundles by the provisioning application to the wireless communication device, wherein the wireless communication device is enabled to establish wireless communication links to different communication networks at least via the RAN and access different wireless communication services by activating a different one of the eSIM provisioning bundles.

11. The system of claim 10, wherein the wireless communication device is an Internet of Things (IoT) device.

12. The system of claim 10, wherein the wireless communication device is one of a mobile phone, a smart phone, a personal digital assistant (PDA), a wearable computer, a headset computer, a laptop computer, a notebook computer, or a tablet computer.

13. The system of claim 10, wherein the contextual information comprises at least one of an identity of a maker of the wireless communication device, an identity of a model of the wireless communication device, a location of the wireless communication device, a radio frequency band supported by the wireless communication device, a maximum data receive speed of the wireless communication device, a maximum data transmit speed of the wireless communication device, or a unique identity of the wireless communication device.

14. The system of claim 10, wherein one of the eSIM provisioning data bundles comprises one or more of a wireless access authentication key, a billing parameter, a rating parameter, a charging parameter, or a quality of service (QoS) parameter.

15. A method of provisioning an electronic subscriber identity module (eSIM) of a wireless communication device, comprising:

receiving a request for electronic subscriber identity module (eSIM) provisioning data by a provisioning application executing on a computer system from a wireless communication device, wherein the request comprises contextual information and is received by the provisioning application from the wireless communication device via a bootstrap eSIM profile that grants restricted access by the wireless communication device to a radio access network (RAN) for the purpose of requesting and receiving the eSIM provisioning data;

searching a data store by the provisioning application based on the contextual information;

receiving a plurality of eSIM provisioning data bundles by the provisioning application from the data store, wherein each eSIM provisioning data bundle provides authentication credentials and configuration data operable for use by the wireless communication device to establish a wireless communication link to a communication network; and sending, according to the bootstrap eSIM profile, the plurality of eSIM provisioning data bundles by the provisioning application to the wireless communication device, wherein the wireless communication device is enabled to establish wireless communication links to different communication networks at least via the RAN and to access different wireless communication services by activating a different one of the eSIM provisioning bundles.

16. The method of claim 15, wherein the wireless communication device is an Internet of Things (IoT) device.

17. The method of claim 15, wherein the wireless communication device is one of a mobile phone, a smart phone, a personal digital assistant (PDA), a wearable computer, a headset computer, a laptop computer, a notebook computer, or a tablet computer.

18. The method of claim 15, wherein the contextual information comprises at least one of an identity of a maker of the wireless communication device, an identity of a model of the wireless communication device, a location of the wireless communication device, a radio frequency band supported by the wireless communication device, a maximum data receive speed of the wireless communication device, a maximum data transmit speed of the wireless communication device, or a unique identity of the wireless communication device.

19. The method of claim 15, wherein one of the eSIM provisioning bundles comprises one or more of a public land mobile network (PLMN) identity, an international mobile subscriber identity (IMSI), a mobile subscriber identification number (MSIN), a mobile network authority (MNC) identity, a mobile country code (MCC), a coverage map, or a preferred roaming list (PRL) a service key.

20. The method of claim 15, wherein one of the eSIM provisioning data bundles comprises one or more of a wireless access authentication key, a billing parameter, a rating parameter, a charging parameter, or a quality of service (QoS) parameter.

* * * * *